United States Patent
Huntley et al.

[19]

[11] Patent Number: 6,102,356
[45] Date of Patent: Aug. 15, 2000

[54] BATTERY RETAINER

[76] Inventors: William F. Huntley, 206 Wellington Rd., Athens, Ala. 35611; Jeffery W. Huntley, 178 Inwood Trail, Madison, Ala. 35758

[21] Appl. No.: 09/034,153

[22] Filed: Mar. 2, 1998

[51] Int. Cl.[7] .................................................. A47B 97/00
[52] U.S. Cl. ......................................... 248/500; 248/503
[58] Field of Search .................................. 248/503, 500, 248/316, 4, 309.1; 180/68.5; 411/531, 400, 437, 546; 206/335

[56] References Cited

U.S. PATENT DOCUMENTS

| | | | |
|---|---|---|---|
| D. 321,856 | 11/1991 | Whitley, II et al. ..................... | 248/503 |
| 2,360,056 | 12/1944 | Heitshu ................... | 180/68.5 |
| 3,420,489 | 1/1969 | Doggett et al. ......................... | 248/503 |
| 4,599,484 | 7/1986 | Bramwell ................................. | 411/437 |
| 4,936,409 | 6/1990 | Nix et al. ................................. | 248/503 |
| 5,052,198 | 10/1991 | Watts ....................................... | 248/503 |
| 5,484,667 | 9/1993 | Salhi et al. .............................. | 248/503 |

FOREIGN PATENT DOCUMENTS

| | | | |
|---|---|---|---|
| 586730 | 5/1955 | Canada .................................. | 180/68.5 |

*Primary Examiner*—Ramon O Ramirez
*Assistant Examiner*—Jerome A. DeLuca
*Attorney, Agent, or Firm*—Waddey & Patterson; John C. Garvin, Jr.

[57] ABSTRACT

A battery retainer apparatus for securing batteries in high performance boats, automobiles, trucks, and other vehicles which are subject to severe shocks. The retainer includes a rectangular non-metallic tray mounted to the vehicles by mounting pads in each corner. The mounting pads are directly connected to walls of the tray by upwardly extending tubes in each corner thereof. A battery is held in the tray by means of either a strap or by bolts.

16 Claims, 4 Drawing Sheets

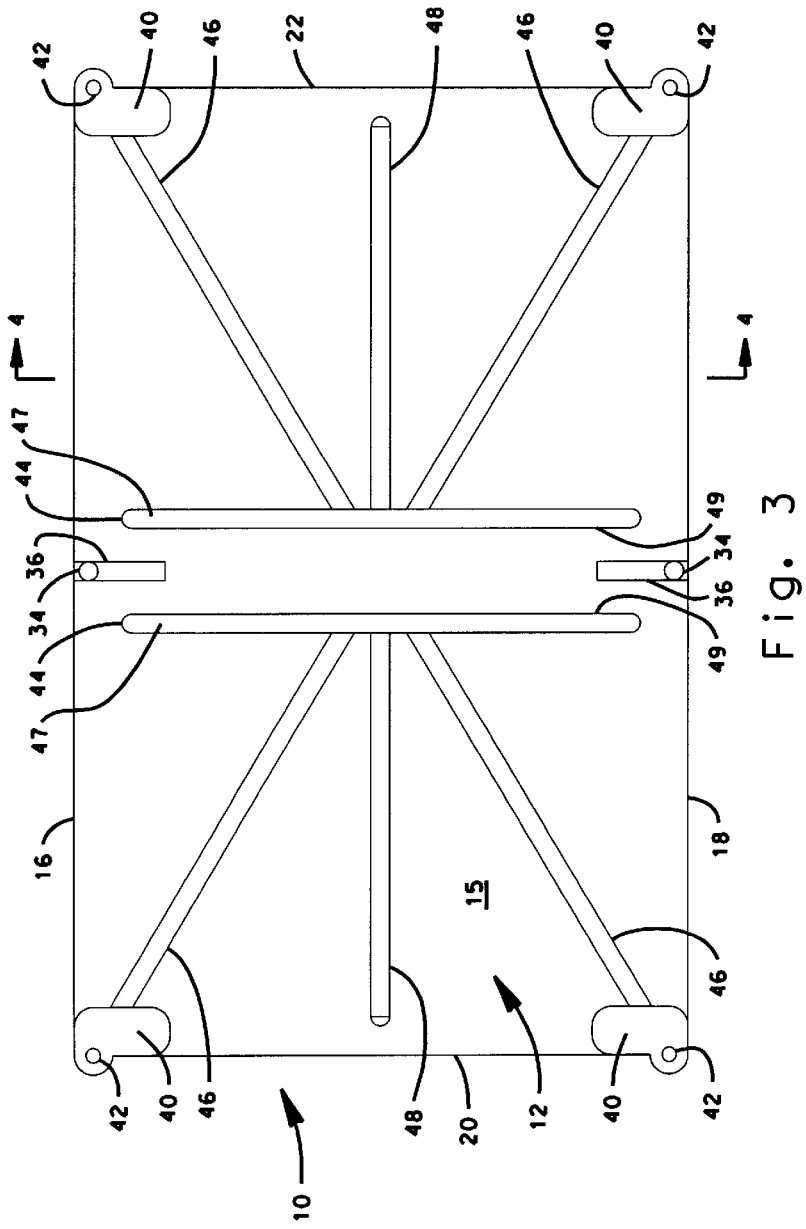
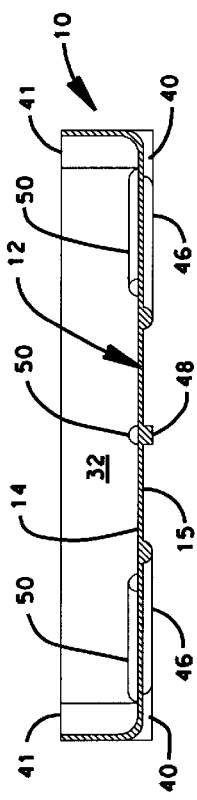

BATTERY RETAINER

TECHNICAL FIELD

This invention relates to a battery retainer apparatus, and more particularly to that class of apparatus useful as a battery tie down device. The present invention has application in all situations wherein a battery should be tied down to prevent movement thereof, but it has particular application for tying down batteries in high performance boats, automobiles, trucks, and other vehicles which are subject to severe shocks.

BACKGROUND OF THE INVENTION

The prior art abounds with apparatuses useful for retaining devices such as batteries and the like. The disadvantages of most prior art devices is that they do not have a hold down means which is at once strong, compact, simple to use and at the same time inexpensive to manufacture. Additionally, prior art devices typically employ either a belt means or a bolt means for holding the battery in place in a battery tray. Each of these hold down means have characteristics which make the device more suitable for given applications. For example, the belt type is quick and simple to use, and is typically corrosion proof. However, for use under severe conditions, such as in high performance boats, the bolt means provide the stronger and more stable battery holding device.

U.S. Pat. No. 4,367,572 discloses a tie down device for a battery comprising a rectangular tray for supporting the battery, two openings in opposed edges of the rectangular tray, and an elastic hold down member having a hook adjacent each of its ends for insertion into the openings of the tray to engage the walls of each opening. In use, the battery is placed in the tray, a hook on one end of the elastic member is inserted into one opening in the tray. The elastic member is then stretched up the side of the battery, over the top of the battery between its cell groups, and down the other side of the battery where the other hook is inserted into another opening in the tray.

There have also been prior art devices which include a container for housing a battery within a vehicle wherein the container has bottom and top portions secured together by a belt wrapped around the container. U.S. Pat. Nos. 1,052,449 and 3,437,164 are exemplary of such prior art devices.

A more recent patent, U.S. Pat. No. 4,936,409 overcomes some of the deficiencies of the above mentioned prior art. The device disclosed in this patent includes mounting means which consist of projections which extend laterally from the base of the device. These projections have serious drawbacks which include the following: 1) They lack the strength necessary to retain a battery under severe vibration and shock conditions such as are often encountered by boats and off road vehicles. As is obvious from an analysis of the projections they consist of a plate attached to a base by a relatively small cross-sectional area. In addition, the apertures for mounting bolts to retain the device in place are located laterally outwardly a considerable distance from the base of the device. This arrangement actually provides a lever arm which further weakens the attachment of the projections to the base of the device. 2) They prevent abutment of battery retainers against one another when a plurality of batteries are mounted in laterally adjacent positions. Direct abutment of a wall of the battery retainer against a vertical wall of the vehicle is also prevented. Such a direct abutment is required when space is at a premium. 3) They require additional floor space for installation of a battery retainer. 4) They require a larger and more complex mold for manufacture of a battery retainer. This adds a significant expense to the cost of manufacture of the retainer.

The instant invention relates to a battery retaining apparatus made substantially of non-metallic material for holding down a battery in a motorized vehicle such as a boat, automobile or truck. The invention provides a device which offers the user a choice of a battery clamping means which is most suited for a particular application. Thus, for normal applications, a user may choose a belt type clamping means which is more economical and offers quick and simple operation. If a user requires a clamping device to prevent the battery from moving particularly during severe shocks such as are encountered by high performance vehicles, a bolt type clamping means may be chosen. Accordingly, the battery tray as herein disclosed provides a unique and versatile means for retaining a battery with either a belt or bolt type clamping means. This arrangement thus overcomes the many disadvantages of the prior art devices.

SUMMARY OF THE INVENTION

This invention relates to a battery retainer apparatus, and more particularly to that class of apparatus useful as a battery tie down device. The present invention has application in all situations wherein a battery should be tied down to prevent movement thereof, but it has particular application for tying down batteries in boats, automobiles, trucks, and other vehicles which are subject to severe shocks. More specifically the invention relates to a battery retainer having a rectangular base reinforced by vertically aligned structural and support ribs formed on the top and bottom surfaces thereof for maximum strength. The base includes mounting pads in each corner for attachment of the battery retainer to a vehicle. Side walls and end walls extend upwardly from the edges of the base and are connected together at the ends thereof by tubes or passages which extend upwardly from the mounting pads. This arrangement provides a strong means for mounting the device to a vehicle in a minimum of space. The retainer is provided with a guide for a hold down strap as well as with support holes extending through each of the side walls for accommodation of battery hold down bolts. The bottom surface of the base is provided with slots for reception of lower portion of "L" shaped bolts to prevent contact of the bolts with the vehicle to which the retainer is attached and to prevent rotation of the bolts during installation and removal of a battery from the retainer. Thus the retainer may be attached to a battery by means of a hold down strap or by means of a pair of "L" shaped bolts.

Accordingly it will be understood that the present invention effectively overcomes the short comings of the prior art as set forth supra.

An object of the present invention is to provide a battery retainer which is attachable to a vehicle by means which are fastened directly to the vertical walls of the retainer so as to provide a high strength attachment to a vehicle.

Another object of the present invention is to provide a battery retainer which is attachable to a vehicle by means which are fastened directly to the vertical walls of the retainer so as to require a minimum of space for mounting of the retainer within the vehicle.

Yet another object of the present invention is to provide a battery retainer which may be fastened to a vehicle by means which are attached directly to the vertical walls of the retainer so as to provide a retainer which is simple and inexpensive to manufacture.

Still another object of the present invention is to provide a clamping apparatus primarily adapted to hold down devices, such as batteries in motorized vehicles, in an effective, efficient, and economical manner.

A further object of the invention is to provide a hold down apparatus which engages the device to be held down in a manner such that the device cannot move about.

A still further object of the invention is to provide a hold down apparatus which is substantially entirely non-metallic, and impervious to the acid electrolyte of the battery thereby precluding corrosion of the hold down apparatus.

Another further object of the invention is to provide a retainer apparatus for devices, such as batteries for use in motorized vehicles, which is easy to install and maintain and which permits simple and quick removal or replacement of the device being retained.

Yet another object of the invention is to provide a battery retainer which achieves maximum strength with a minimum amount of material and which occupies a minimum space.

These objects as well as other objects of the present invention will become more readily apparent after reading the following description in conjunction with the accompanying drawings.

BRIEF DESCRIPTION OF THE DRAWINGS

FIG. 3 is a bottom view of the apparatus illustrated in FIGS. 1 and 2.

FIG. 4 is a sectional view taken along line 4—4 of FIG. 3.

DESCRIPTION OF THE PREFERRED EMBODIMENT

Prior art devices generally clamp a battery in place by use of a belt or by use of rigid metallic elements held in place by bolts. Each of these clamping devices has certain advantages over the other. For example, while belts when equipped with non-metallic fasteners are impervious to corrosion, they cannot draw a battery as rigidly into position as the use of bolt type clamping means. Thus, if a bolt type clamping means is to be used in a salt water environment use of expensive corrosion resistant bolts are required. It is also apparent that a belt is more likely to stretch or to come loose than a bolt arrangement. The strength of a bolt type clamping means is also typically much greater than that of a belt. And yet a belt clamping means which is less expensive and easier to use, is quite adequate for many applications.

The present invention contemplates the above mentioned and other deficiencies of prior art devices and also considers the desirability of providing a battery hold down device which permits the installation and removal of a battery from a motorized vehicle quickly and with minimum or no the use of tools. The present invention relates to a battery hold down device which may be manufactured inexpensively, is durable, and useful for its purpose.

Figure 1:
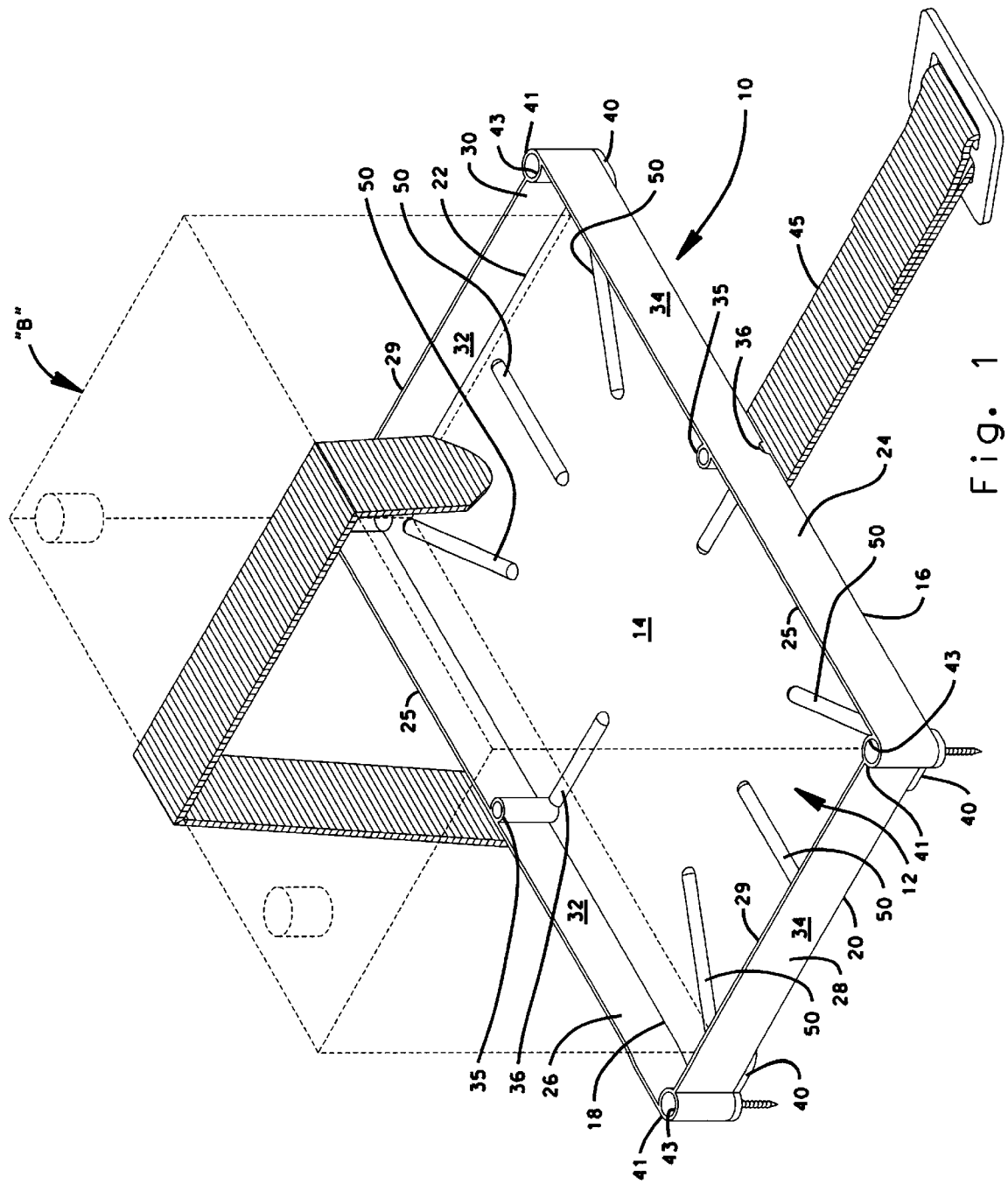
FIG. 1 is a perspective view of the battery retainer of the present invention wherein a strap is illustrated for holding a battery in the retainer.
Figure 2:
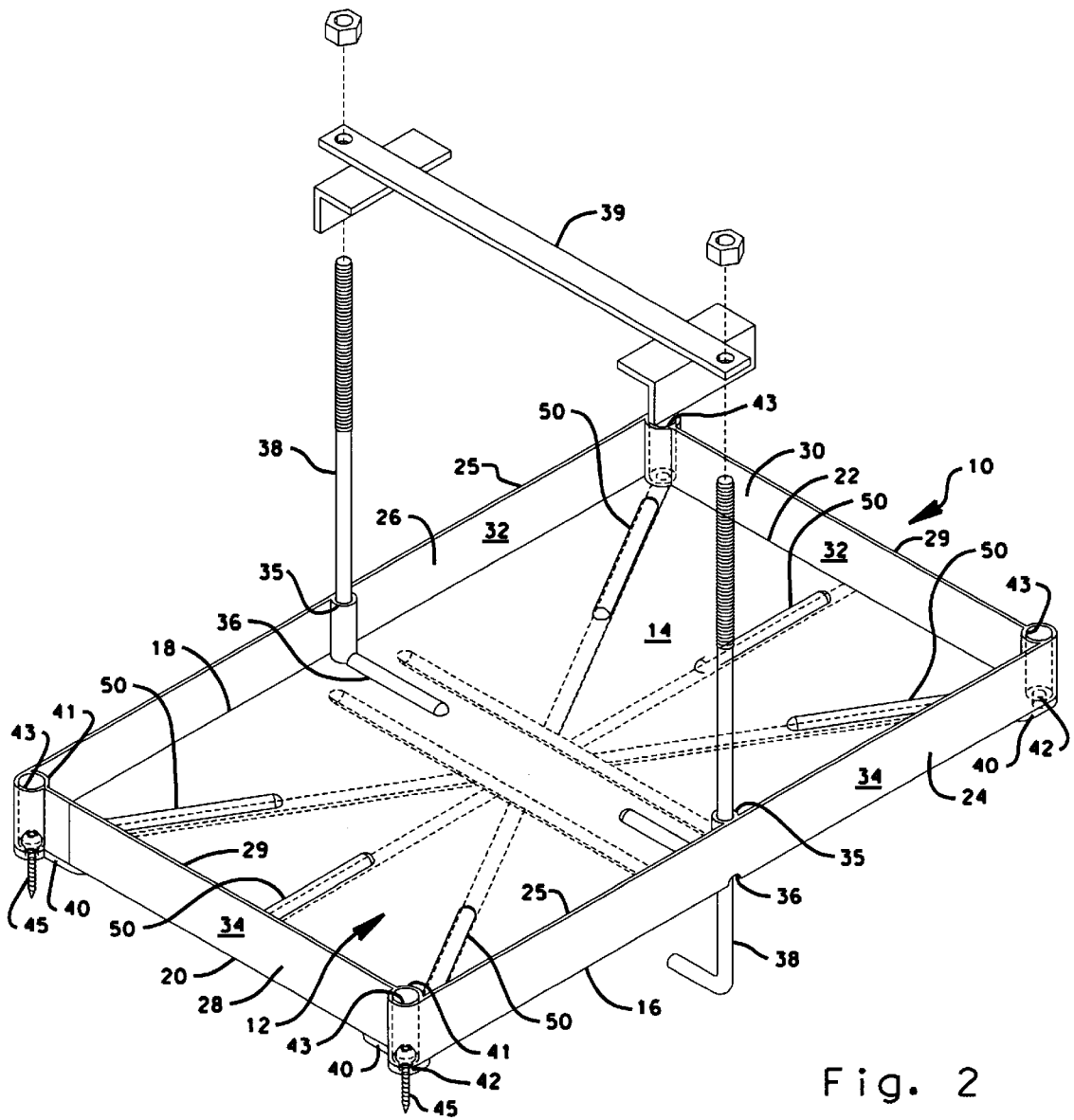
FIG. 2 is a perspective view of the battery retainer of the present invention wherein "L" shaped bolts are utilized to hold a battery in the retainer and wherein details of the under surface of the retainer are illustrated.

Now referring to the drawings, and in particular to FIGS. 1 and 2, the battery retainer which is the subject of the present invention comprises a tray referred to generally by the numeral 10. The tray 10 includes a base 12 having a top surface 14, and as best illustrated in FIG. 3, a bottom surface 15. The base 12 also includes a pair of side edges 16, and 18, and a pair of end edges 20 and 22. Each of side walls 24 and 26 extend upwardly from side edges 16 and 18 respectively and has a top rim 25. Each of end walls 28 and 30 extend upwardly from end edges 20 and 22 respectively and has a top rim 29. The edges 16, 18, 20 and 22 are defined as having a lateral width equal to the thickness of the walls 24, 26, 28 and 30. Each of the walls 24, 26, 28, and 30 has an inner surface 32 and an outer surface 34. The outer surfaces 34 of the walls 24, 26, 28, and 30 define generally planar surfaces. The intermediate portions of the inner surfaces 32 of the side walls 24 and 26 are provided with vertical bolt passages 35. Laterally extending slots 36 are formed in the bottom surface 15 of the base 12 and communicate with bolt passages 35 for reception of "L" shaped bolts 38. Mounting pads 40 extend downwardly from the bottom surface 15 of base 12. As best illustrated in FIGS. 2 and 3, the mounting pads 40 include apertures 42 which extend downwardly therethrough. Tubes 41 extend upwardly from said mounting pads to a point in planar relations with the top rims 25 and 29 of end walls 24 and 26 and side walls 28 and 30. Such structure prevents the potential leaking of acid from tray 10 through the tubes 41. Bores 43 are formed in each of the tubes 41. As illustrated in FIG. 2, bores 43 are larger than apertures 42 and are positioned in concentric relation therewith so as to provide a passage for the heads of screws 45. The tubes 41 in conjunction with pads 40 serve as corner supports for attachment of the side walls 24 and 26 to the end walls 28 and 30. It will be noted that the outer surface of the walls 24 and 26 are attached generally tangentially to the tubes 41. This feature permits arrangement of multiple battery retainers 10 in the closest possible lateral relationship. Thus, it will be understood that this arrangement permits substantial wall to wall contact between the walls of adjacent battery retainers. This contact provides mutual support for the contacting walls as well a maximum use of space, which is often critically limited. As illustrated in FIG. 3, a pair belt guides 44 extend downwardly from the bottom surface 15 and serve to align and secure a battery retainer belt 45, such as is illustrated in FIG. 1. The belt guides 44 are rectangular in cross-section to provide a flat bottom surface 47 (FIG. 3) for contact with a maximum area of the surface of the device upon which the tray is to rest. Thus, when the battery retainer 10 is placed upon a flat surface, the longitudinal intermediate portion of the retainer is provided with substantial support to prevent bending of the retainer in this high stress area. As illustrated in FIG. 3, vertical edges 49 of the belt guides 44 connect to the flat bottom surface 47 to firmly retain the belt in place and to eliminate any possibility of belt movement between the belt guides 44 and a surface of the device to which the retainer is attached. As best illustrated in FIG. 3, structural ribs 46 also extend downwardly from the bottom surface 15 and extend diagonally from the mounting pads 40 and generally to the mid portion of the base 12 and connect to belt guides 44. Similar support ribs 48 extend inwardly from a point adjacent the intermediate portion of end edges 20, 22 and connect to the belt guides 44 intermediate the structural ribs 46. It will be understood that all elements which extend downwardly from the bottom surface 15 terminate on the same plane so as to provide a stable seating for the tray 10 upon the vehicle to which it may be attached. As best illustrated in to FIGS. 2 and 4, upwardly extending support bars 50 are formed upon the top surface 14 of the base 12 to support a battery "B", (the outline of which is illustrated in FIG. 1) which is to be retained in the tray 10. To provide a stable battery support, the support bars 50 extend upwardly so as to terminate on the same plane. To provide maximum strength to the base 12, each of the support bars 50 is positioned immediately above a support rib 48 or a structural rib 46, as best illustrated in FIGS. 2 and 4.

Figure 5:
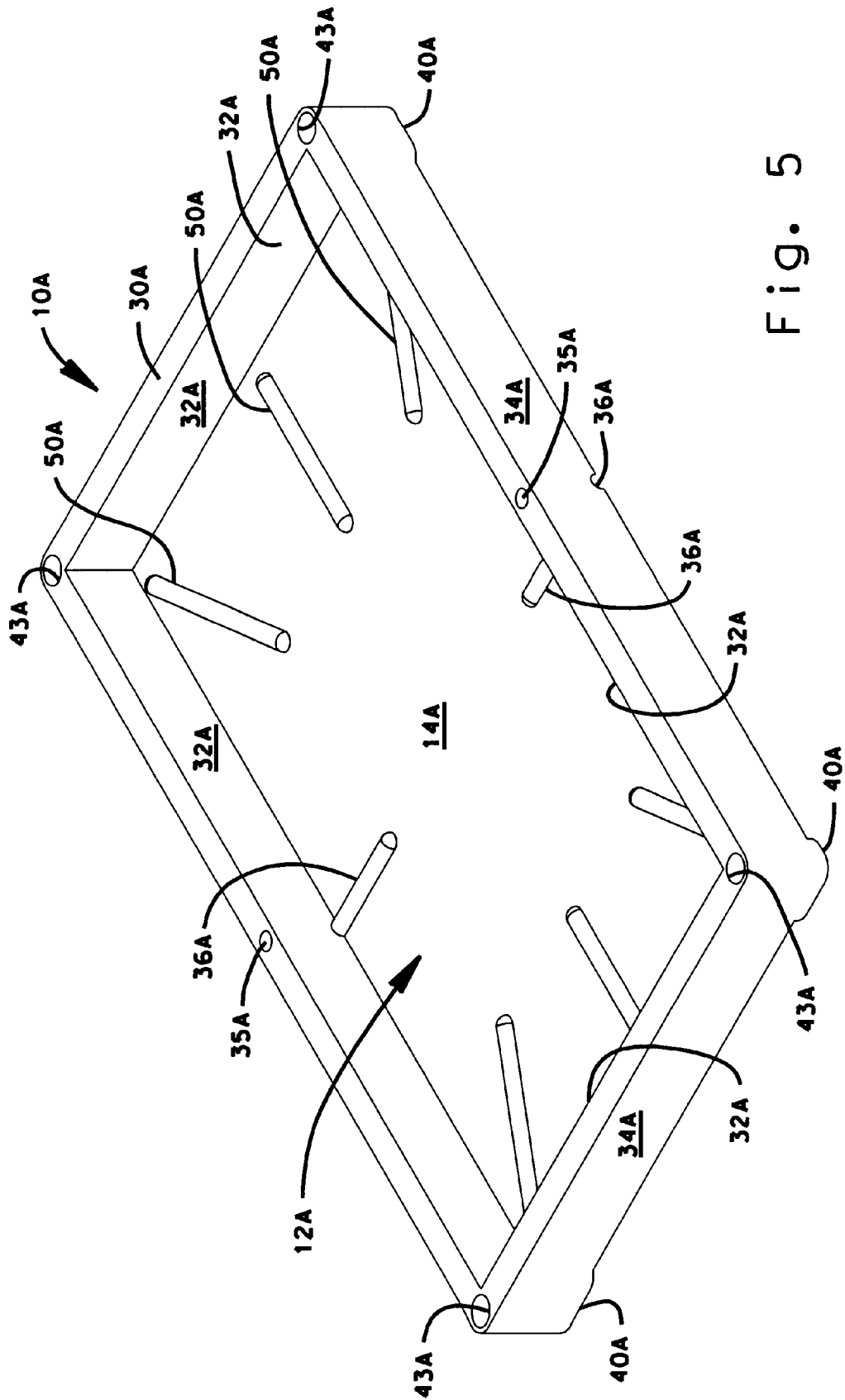
FIG. 5 is a perspective view of a second embodiment of the invention
and wherein the outer walls as well as the inner walls of the battery retainer are of a planar configuration.

Referring to the embodiment illustrated in FIG. 5, it will be noted that in comparison to the embodiment illustrated in FIGS. 1–4, inner surfaces 32A of walls 24A, 26A, 28A, and 30A have been moved inwardly so as to enclose the vertical bolt passages 35A and thereby provide inner surfaces 32A, which, like the outer surfaces 34A, provide planar surfaces which include no protrusions. This embodiment is configured to retain a battery in a high performance boat or land vehicle wherein shocks are well beyond those experienced in normal use. It will be noted that a great deal more material has been included in this "Thick Wall" embodiment. The "Thick Walls" of this embodiment provide a great deal of additional strength. In addition, it will be noted that the inner and outer walls are totally of a planar configuration. Thus, inner walls 32A conform to the surfaces of the battery being retained. Also, the outer walls 34A conform to the outer walls 34A of any similar battery retainer which may be placed in contact therewith in either a lateral or longitudinal arrangement of multiple battery retainers.

The foregoing is provided for purposes of illustration, explanation, and description of the preferred embodiment of the present invention. Modifications, variations and adaptations of this embodiment will be apparent to those of ordinary skill in the art and they may be made without departing from the scope or spirit of the invention.

I claim:

1. An apparatus for retaining a battery in a vehicle, said apparatus comprising:
    a rectangular tray; said tray including a base having a top surface and a bottom surface, a pair of spaced apart side edges, a pair of spaced apart end edges adjoining said side edges so as to form four corner portions, a mounting pad having an aperture therethrough formed at each of said corner portions, a pair of end walls extending upwardly from said end edges, a pair of side walls extending upwardly from said side edges, and a connector tube attached to each said mounting pad and said base and extending upwardly therefrom to a point substantially above said top surface of said tray and joined to a said side wall and a said end wall, said connector tube having an inner diameter larger than said aperture and aligned co-axially therewith.

2. An apparatus as set forth in claim 1 wherein said base further includes a pair of parallel spaced and downwardly extending belt guides formed in said bottom surface generally intermediate said end walls, and disposed for reception of a battery hold down belt.

3. An apparatus as set forth in claim 1 wherein vertically extending bolt passages are attached to each side wall of said pair of side walls generally intermediate said end walls and disposed for support of battery hold down bolts.

4. An apparatus as set forth in claim 3 wherein each of said side walls has an inner surface, and a planar outer surface intermediate said connector tubes and wherein each said vertically extending bolt passage is formed, inside said planar outer surface and as a part of said inner surface.

5. An apparatus as set forth in claim 4 wherein a laterally inwardly extending slot is formed in said bottom surface in communication with each said bolt passage, said slot disposed for reception of an "L" shaped battery hold down bolt.

6. An apparatus as set forth in claim 2 wherein a pair of downwardly extending structural ribs are formed on said bottom surface and extend radially outwardly from each of said belt guides, each of said structural ribs connecting to one of said mounting pads.

7. An apparatus as set forth in claim 6 wherein said mounting pads, said belt guides and said structural ribs each terminate in a downward direction on the same plane.

8. An apparatus as set forth in claim 7 wherein at least one support rib extends along the bottom of said base from each said belt guide to a point adjacent of said end edges.

9. An apparatus as set forth in claim 7 wherein battery support bars protrude upwardly from said top surface vertically above and in vertical alignment with each of said structural ribs and said support ribs and extending inwardly from points adjacent said end walls.

10. An apparatus as set forth in claim 3 wherein each of said side walls has a planar inner surface and a planar outer surface intermediate each said connector tubes and wherein each said planar outer surface is joined tangentially to a respective said tube whereby no part of said tube is positioned outside said planar outer surface.

11. An apparatus for retaining a battery in a vehicle, said apparatus comprising:
    a rectangular tray; said tray including a base having a top surface and a bottom surface, a pair of spaced apart side edges, a pair of spaced apart end edges adjoining said side edges so as to form four corner portions, a mounting pad having an aperture therethrough formed at each of said corner portions, a pair of end walls extending upwardly from said end edges with each end wall having a top rim, a pair of side walls extending upwardly from said side edges with each side wall having a top rim, and a connector tube attached to each said mounting pad and said base and extending upwardly therefrom to a point in planar relations with said top rims of said end and side walls and joined to a said side wall and a said end wall, said connector tube having an inner diameter larger than said aperture and aligned co-axially therewith.

12. An apparatus as set forth in claim 11 wherein said base further includes a pair of parallel spaced and downwardly extending belt guides formed in said bottom surface generally intermediate said end walls, and disposed for reception of a battery hold down belt.

13. An apparatus as set forth in claim 12 wherein said base further includes a pair of parallel spaced and downwardly extending belt guides formed in said bottom surface generally intermediate said end walls, and disposed for reception of a battery hold down belt.

14. An apparatus as set forth in claim 11 wherein vertically extending bolt passages are attached to each side wall of said pair of side walls generally intermediate said end walls and disposed for support of battery hold down bolts.

15. An apparatus as set forth in claim 14 wherein each of said side walls has an inner surface, and a planar outer surface intermediate said connector tubes and wherein each said vertically extending bolt passage is formed, inside said planar outer surface and as a part of said inner surface.

16. An apparatus as set forth in claim 15 wherein a laterally extending slot is formed in said bottom surface in communication with each said bolt passage, said slot disposed for reception of an "L" shaped battery hold down bolt.

\* \* \* \* \*